(No Model.)
J. S. DEATS & T. R. STEWART.
AXLE NUT.
No. 519,468.　　　　　　　　Patented May 8, 1894.
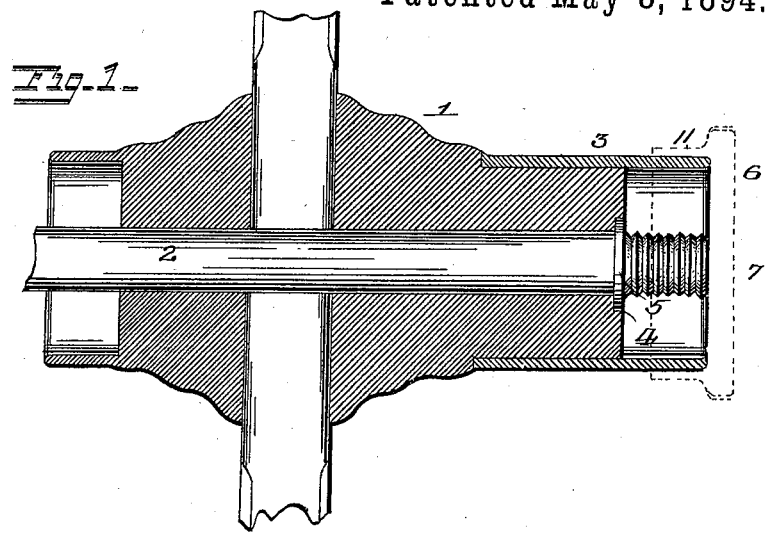
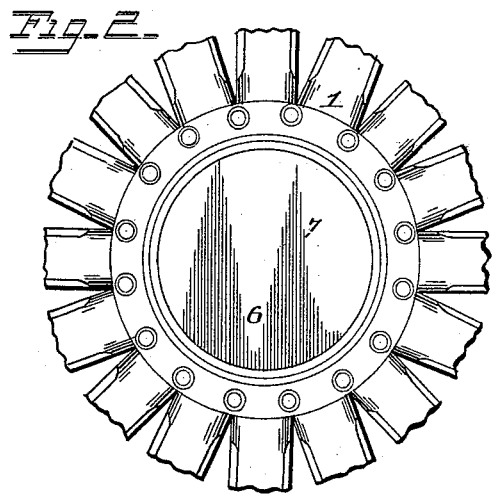
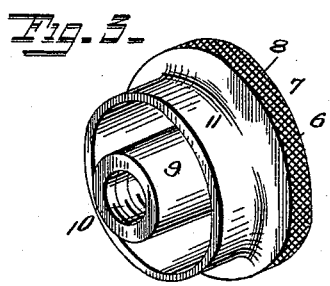
Inventor
John S. Deats
and
Thomas R. Stewart
By John Wedderburn
his Attorney
Witnesses

UNITED STATES PATENT OFFICE.

JOHN S. DEATS AND THOMAS R. STEWART, OF PHŒNIX, ARIZONA TERRITORY.

AXLE-NUT.

SPECIFICATION forming part of Letters Patent No. 519,468, dated May 8, 1894.

Application filed October 5, 1893. Serial No. 487,269. (No model.)

*To all whom it may concern:*

Be it known that we, JOHN S. DEATS and THOMAS R. STEWART, citizens of the United States, and residents of Phœnix, in the county of Maricopa and Territory of Arizona, have invented certain new and useful Improvements in Axle-Nuts; and we do hereby declare the following to be a full, clear, and exact description of the invention, such as will enable others skilled in the art to which it appertains to make and use the same.

This invention relates to axle-nuts, of that character known as cap nuts, and has for its object to produce a nut of the character set forth which is cast in one piece of various sizes to fit different axles and of such formation that when the nut is screwed on the axle, it reaches over the hub-band and prevents dust and sand from accumulating around the axle.

With these and other objects in view, the invention consists of the construction and arrangement of the several parts, which will be more fully hereinafter described and claimed.

In the drawings: Figure 1 is a sectional view of a portion of an axle and hub, showing the improved nut applied thereto. Fig. 2 is a front elevation of the parts shown in Fig. 1. Fig. 3 is a detail perspective view of the improved nut, looking toward the rear of the same.

Similar numerals of reference are employed to indicate corresponding parts in the several views.

Referring to the drawings, the numeral 1 designates a hub, and 2 an axle on which the said hub is mounted. On the outer end of the hub is a hub-band 3 and the portion surrounded by the said hub-band is formed with a concentric washer recess 4 for the purpose of receiving a washer 5.

The numeral 6 designates the nut, which comprises an outer closed face 7 of circular form and whose edge is milled as at 8, to provide for a quick and ready application of the nut without the employment of a wrench. Extending from the center of the rear portion of the said face 7 is a socket 9 with a screw threaded opening 10 adapted to take over the screw threaded end of the axle and the inner end of the said socket when the nut is applied bears closely against the washer 5. The said socket is surrounded by a concentric flange 11 of less rearward extent than the said socket and at such a distance therefrom in a diametrical direction as to permit the entrance of the hub-band into the space between the said socket and flange, and cause a close bearing of the inner surface of the flange with the outer surface of the said hub-band. By this means it will be observed that a convenient means of fastening the hub on the axle is not only produced, but an absolute protection is secured against the entrance of dust or sand into the outer end of the hub and axle with an evident benefit and advantage.

The device is exceptionally simple and effective in its construction and operation and can be easily and quickly applied as may be found desirable. It is obviously apparent that many minor changes might be made in the several parts without in the least departing from the nature or spirit of the invention.

It is obviously apparent that any form of projection on the exterior of the nut might be used, either in square hexagonal or octagonal form for the purpose of applying a wrench, should it become necessary.

Having thus described the invention, what is claimed as new is—

The herein described cap or axle nut having a central screw threaded socket adapted to engage the end of the axle and a concentric surrounding flange to take over and bear on the hub-band, the edge of the nut being milled for the purpose of removable attachment, substantially as described.

In testimony whereof we have signed this specification in the presence of two subscribing witnesses.

JOHN S. DEATS.
THOMAS R. STEWART.

Witnesses:
M. H. WILLIAMS,
NATHANIEL HUDSON.